April 6, 1965 R. A. GREINER 3,177,372
CONSTANT POWER DISSIPATING CIRCUIT
Filed June 30, 1960
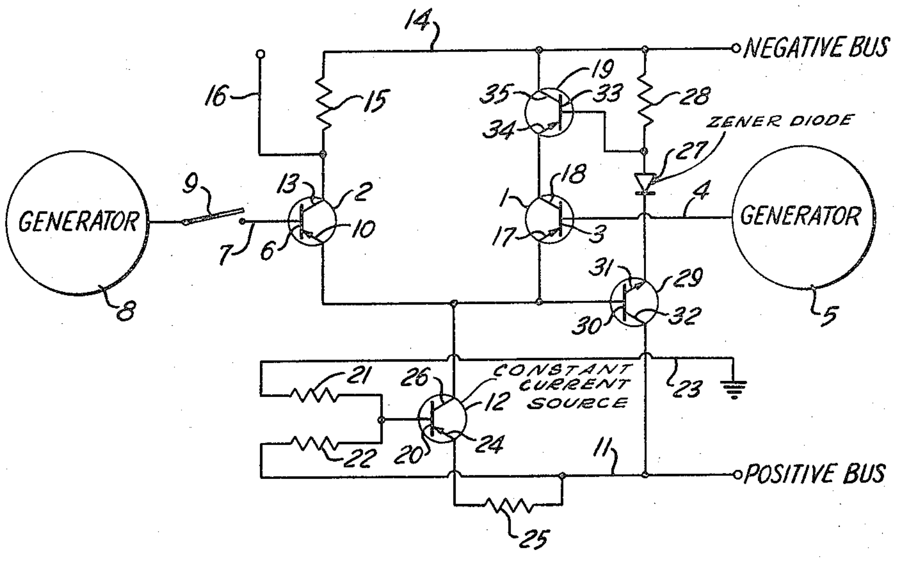
INVENTOR.
Richard A. Greiner
BY
Andrus & Starke
Attorneys United States Patent Office 3,177,372

Patented Apr. 6, 1965

3,177,372

CONSTANT POWER DISSIPATING CIRCUIT

Richard A. Greiner, Madison, Wis., assignor to Gisholt Machine Company, Madison, Wis., a corporation of Wisconsin Filed June 30, 1960, Ser. No. 39,854
11 Claims. (Cl. 307—88.5)

This invention relates to a constant power dissipating transistor circuit for maintaining the operating characteristics of a transistor and particularly adapted for a transistorized comparator circuit employing a reference transistor and a control transistor with a current shift from one of the transistors to the other in the comparing operation.

To establish a comparison, for example, between a reference signal and an unknown signal, a pair of parallel connected transistors can be employed. One of the signals is applied to one transistor to establish normal conduction through the transistor. The second transistor is connected to the other signal which establishes a comparison of the signals and at the instance of a particular signal relation, the current shifts from the first transistor to the second transistor. A suitable output circuit is connected to detect the change of current and thereby to tect the level of the unknown signal.

Hereinafter, for purposes of discussion, the unknown signal is assumed to be a constant voltage signal applied to a control transistor and the reference signal a variable voltage signal applied to a reference transistor.

Transistors are exceptionally temperature sensitive and the operating characteristics of transistors change with temperature. Changes in the input level to a transistor therefore results in temperature and operating characteristic changes. Such changes result in drift of the operating point of the transistor. In a transistor comparison circuit, the level of comparison neded to shift the current from the one transistor to the other has not been a constant linear function and such circuits have not produced highly reliable and accurate results.

The present invention is directed to a circuit providing a constant power dissipation in a conducting transistor such as employed in a comparator circuit or any other suitable circuit to maintain a fixed temperature differential between that transistor and any other associated transistor or the like. Thus, although the power dissipation in the two transistors is different and the temperature of the two transistors therefore differs, the difference is maintained constant and consequently, the relationship of the characteristic is maintained constant. When employed in a comparator circuit, a true and reliable comparison of the signals is provided.

Generally, in accordance with the present invention in a comparator circuit, a constant current drive is connected in series with two paralleled transistors. A voltage reference or regulating diode or other similarly functioning device is effectively connected across a normally conducting transistor to maintain a constant voltage across the normally conducting transistor. Consequently, with the constant current source driving the two transistors and with the constant voltage maintained across the one transistor, the power in the latter transistor, while conducting, is constant and the temperature is at a constant level above the other associated transistor or the like. The temperature difference is maintained at a constant level and all comparisons of incoming and reference signals is accurate and reliable.

In accordance with another aspect of the present invention, amplifying transistors are interposed between the connections of the voltage regulating diode to the normally conducting transistor to maintain normal operation of the conducting transistor.

The present invention thus provides a transistorized circuit including temperature stabilizing means by positively controlling the power dissipated in a transistor and thereby maintaining the operating characteristics and preventing error normally introduced by the heating effects associated with a conducting transistor.

The drawing furnished herewith illustrates the best mode presently contemplated for carrying out the invention.

The drawing is a schematic circuit diagram illustrating a preferred construction of a comparator circuit including a constant power dissipating transistor circuit in accordance with the present invention.

Generally, the illustrated comparator circuit includes a control transistor 1 receiving an unknown voltage signal and connected in parallel with a reference transistor 2 connected to a readable varying reference voltage signal. The transistors 1 and 2 are illustrated as the conventional PNP type connected in a parallel common emitter configuration. The base 3 of the control transistor 1 is connected by an input lead 4 to an unknown signal source, diagrammatically shown as a generator 5.

The generator 5 is coupled to be driven in response to any measurable unknown such as an unbalance in a rotating part and establishes a control signal in proportion to the unknown being measured.

A base 6 in the reference transistor 2 is connected by an input lead 7 to a generator 8 adapted to establish a readable signal. The generator 8 is of any suitable variety adapted to establish an incremently or continuously increasing signal and is shown diagrammatically in the drawing.

For an example of suitable generators 5 and 8, reference may be made to applicant's copending patent application entitled Digital Counter Drive for Balancing Apparatus, filed on even date herewith and assigned to a common assignee wherein a digital type counter drive is shown employing the comparator circuit constituting a part of the present invention.

A switch 9 is shown in the present invention connected in the circuit of the generator 8 to control establishment of the reference signal after the signal from generator 5 has been applied to the base 3 of the control transistor 1.

The reference transistor 2 includes an emitter 10 which is connected to a positive bus 11 in series with a constant current transistor 12. A collector 13 of the transistor 2 is connected to a negative bus 14 in series with a load resistor 15. When the transistor 2 conducts, an output signal is developed across the load resistor 15. An output line 16 is connected to the collector 13 and an output signal is established at the instant the reference signal on lead 7 exceeds the control signal on lead 4, as more fully described hereinafter.

The control transistor 1 is generally similar to reference transistor 2 and includes an emitter 17 which is connected in common with the emitter 10 of transistor 2 to the positive bus 11 in series with the constant current transistor 12. A collector 18 of the transistor 1 is connected to the negative bus 14 via an amplifying transistor 19.

The control signal from the generator 5 normally biases the transistor 1 to conduct and consequently, the current established by the constant current transistor 12 flows completely through the transistor 1 prior to the instant of comparison.

The constant current transistor 12 includes a base 20 connected to the junction of a pair of series connected biasing resistors 21 and 22. The resistors 21 and 22 are connected between the positive bus 11 and a ground line 23 to establish a bias on the base which is negative with respect to an emitter 24 of the transistor 12. The emitter 24 is connected in series with a swamping resistor 25 to the positive bus 11. Consequently, the transistor 12 is biased to continuously conduct a predetermined current.

The transistor 12 further includes an output collector 26 connected directly in common to the emitters 10 and 17 of the respective transistors 2 and 1. The transistor 12 establishes a constant current through either transistor 1 or 2 depending upon which is biased to conduct.

Prior to a comparison, the base 3 of the transistor 1 has the unknown signal from the generator 5 and the transistor is biased to conduct and carry the current from the constant current transistor 12.

The transistor 2 is not biased to conduct until the generator 8 is connected, by the closing of switch 9, to the base 6 of the transistor 2. Even then, until the output of the reference signal exceeds the level of the control signal of generator 5, the control transistor 1 continues to conduct.

The constant current through transistor 1 is returned to the negative bus 14 through the amplifying transistor 19.

A voltage regulating diode 27 is effectively connected across the emitter 17 and collector 18 of the transistor 1 to establish a constant voltage across the transistor.

The voltage regulating diode 27 is a conventional element which is biased in a reverse direction and prevents conduction until a predetermined voltage known as the breakdown voltage is applied across the diode. The current then flows through diode 27. After the initial starting of conduction through diode 27, the voltage drop across the diode 27 remains at a particular voltage although varying amounts of current will flow through the diode at the constant voltage.

In the illustrated embodiment of the invention, the diode 27 is connected between the negative bus 14 and the positive bus 11. A resistor 28 is connected in series between the diode 27 and the negative bus 14. An amplifying transistor 29 is connected between the diode 27 and the positive bus 11.

The amplifying transistor 29 connects the emitter 17 of the control transistor 1 to the one side of the diode 27 to establish the voltage of the emitter 17, as follows.

The illustrated transistor 29 is a conventional NPN type having an input base 30, an emitter 31 and a collector 32. The NPN transistor 29 is connected as a common collector transistor with the base 30 connected to the emitter 17 of the control transistor 1. The emitter 31 of the transistor 29 is connected directly to one side of the diode 27 and the collector 32 is connected directly to the positive bus 11. The very low internal resistance of transistor 29 results in essentially the same voltage at the base 30 and the emitter 31 of transistor 29. Therefore, the emitter 17 of the control transistor 1 which is tied to base 30 is essentially at the same voltage as the emitter 31 of transistor 29 and therefore as the one side of diode 27.

The transistor 19 similarly connects the opposite side of the voltage regulating diode 27 to the collector 18 of the control transistor 1, as follows.

The illustrated transistor 19 is a conventional PNP type and includes an input base 33, an emitter 34 and collector 35. The base 33 is connected to the diode 27. The emitter 34 is connected directly to the collector 18 of the control transistor 1. The collector 35 is connected to the negative bus 14 to complete the circuit. With the bias connection just described, the emitter 34 and the base 33 of transistor 19 are essentially at the same voltage level.

Thus, the voltage regulating diode 27 is effectively connected across the emitter 17 and the collector 18 of the control transistor 1. The amplifying transistors 19 and 29 are connected as emitter follower amplifiers and establish suitable gain to prevent loading of the transistor 1 by the voltage regulating diode 27.

The potential of emitter 17 of the control transistor 1 follows the potential of the base 3. A voltage change in the base 3 and thus in emitter 17 of transistor 1 changes the voltage at the corresponding side of diode 27. However, the voltage across the diode 27 is inherently constant within the operating range and consequently the opposite side of the diode 27 changes by the same amount and in the same direction. The collector 18 of transistor 1 is connected to the latter side of diode 27 and is correspondingly changed and therefore is held at the same voltage relative to emitter 17.

Consequently, any control signal applied to the base 3 of the control transistor 1 results in a corresponding similar shifting of the voltage of the emitter 17 and the collector 18 to maintain a constant voltage across the transistor 1 in accordance with the voltage across diode 27. Thus, if the voltage applied to the base 3 of the control transistor 1 is changed, the emitter 17 and the collector 18 move essentially instantaneously so as to maintain the constant voltage across the transistor 1. The current through diode 27 changes to maintain the constant voltage.

The voltage regulating diode 27 maintains a constant voltage across the control transistor 1 and the constant current transistor 12 maintains a constant current flow through the transistor 1 for all control signals. The power dissipation in the transistor 1, which is equal to the product of the current and the voltage, is a constant value for all control signals. The power dissipation in the nonconducting transistor 2 is also constant. The power dissipated in both transistors 1 and 2 is therefore constant and the temperature difference between the control transistor 1 and the reference transistor 2 is maintained at a constant level resulting in exceedingly stable operation of the comparator circuit.

The operation of the illustrated embodiment of the invention is summarized as follows:

The generator 5 establishes a control signal at the control transistor 1 in accordance with the unknown signal. The switch 9 is then closed to establish a progressively increasing reference signal upon the reference transistor 2. At the start of the comparison, the control transistor 1 is biased to conduct by the control signal from the generator 5.

The constant current transistor 12 establishes a constant current flow through the transistor 1 and the voltage regulating diode 27 maintains a constant voltage across the transistor 1. The control transistor 1 therefore conducts with a constant power dissipation. The reference transistor 2 is not biased to conduct, carries essentially no current and is not dissipating any power.

The control transistor 1 is dissipating a constant amount of power and the reference transistor 2 is dissipating essentially no power. A constant power dissipation difference therefore exists between the reference transistor 2 and the control transistor 1. The operating characteristics of the transistors 1 and 2 are thereby held in constant relationship and provide similar responses to comparisons of different input control signals.

As the reference generator 8 changes its voltage signal, the bias on the reference transistor 2 approaches the bias on the transistor 1. At the instant of comparison, the reference signal of the generator 8 tends to pass the unknown control signal on transistor 1 and causes the reference transistor 2 to conduct and the current shifts from the control transistor 1 to the reference transistor 2. An output signal is developed across the load resistor 15 and appears on the output line 16. The latter may be connected to trigger a suitable detection device for recording the level of the reference signal at the moment of current shift. In this manner, an accurate comparison is established and a true determination of the unknown bias is obtained.

In accordance with complementary symmetry, the illustrated PNP transistors and NPN transistors in the comparator circuit may be changed to the opposite type with the necessary change in the polarity of the voltages.

The present invention thus provides a constant power dissipating transistor circuit which is particularly adapted for providing a very temperature insensitive comparator circuit or the like.

Various modes of carrying out the invention are contemplated as being within the scope of the following claims particularly pointing out and distinctly claiming the subject matter which is regarded as the invention.

I claim:

1. A constant power dissipating circuit, comprising a solid state amplifying device having varying characteristics with temperature and having a signal input element and at least two output elements, a constant current means connected in series with one of the output elements to establish a constant current in the device, and a constant voltage means effectively connected across the output elements and biased to conduct simultaneously with said transistor and establish a constant power dissipation in the device.

2. A constant power dissipating transistor circuit, comprising a transistor having an emitter element, a base element and a collector element, one of which elements constitutes an input signal terminal, a constant current means connected in series with a second of said elements, and a voltage regulating means effectively connected across the second and third of said elements and establishing a predetermined constant voltage during the conduction of the transistor to establish a constant power dissipation in the transistor.

3. A constant power dissipating transistor circuit comprising a transistor having a common emitter, an input base and an output collector, a constant current source connected in series with the emitter to establish constant current through the transistor, and a constant voltage means effectively connected across the emitter and the collector and establishing a predetermined constant voltage during conduction of the transistor to establish a constant power dissipation in the transistor.

4. A constant power dissipating transistor circuit comprising a transistor having a common emitter, an input base and an output collector, a constant current transistor having an output collector connected to the common emitter and a constant bias establishing a constant current through the first named transistor, and a voltage regulating diode effectively connected across the emitter and the collector of the first named transistor and biased to establish a contact voltage across the first named transistor with varying input signals causing the first named transistor to conduct and thereby maintaining constant power dissipation in the first named transistor.

5. A constant power dissipating transistor circuit connected to a power supply, comprising a transistor having an emitter element, a base element and a collector element, one of which elements constitutes an input signal terminal, a second of which elements constitutes an input-output element and a third of which elements constitutes an output element, a constant current transistor connected between a second of said elements and the power supply, said constant current transistor being biased to establish a constant current through the first named transistor, a voltage source having a constant voltage, an amplifying transistor connected in series with the voltage source and having an input connected to the input-output element of the first named transistor, and a second amplifying transistor connected in series with the output element of the first named transistor and having an input connected to the opposite side of the voltage source from said first amplifying transistor to establish a constant power dissipation in the first named transistor for all input signals.

6. A constant power dissipating transistor circuit connected to a power supply, comprising a transistor having an input base and an output collector and a common emitter, a constant current transistor having a common emitter and having a collector connected to the common emitter of the first named transistor, said constant current transistor being biased to establish a constant current through the first named transistor, a voltage regulating means having a constant voltage drop, an amplifying transistor having a base connected to the common emitter of the first named transistor and having an emitter connected to the voltage regulating means, a second amplifying transistor having a base connected to the opposite side of the voltage regulating means and having an emitter connected to the collector of the first named transistor, and supply bias connections connected to the first named transistor and to the constant current transistor and to the amplifying transistors and to the voltage regulating means for establishing simultaneous conduction thereof and thereby establishing a constant power dissipation in the first named transistor.

7. A transistorized signal comparing circuit comprising a transistor having an emitter element, a base element and a collector element, a second transistor having an emitter element, a base element and a collector element, a corresponding element in each transistor constituting a signal input terminal to the respective transistors, a constant current means connected in series with a second corresponding element in each of said transistors, and a voltage regulating means connected across the second and third of said elements of one said transistors and biased to conduct simultaneously with said transistor to establish a constant power dissipation in the corresponding transistor.

8. In a signal comparing circuit, a transistor with a constant bias, a transistor with a variable bias, each of said transistors having an emitter and a collector and a base with the emitters connected in common, a constant current transistor connected to said emitters and adapted to be connected to a positive voltage source to establish a constant current in the circuit, a load impedance connected to the collector of the transistor with a variable bias, and adapted to be connected to a negative voltage source, an amplifying transistor connected to the collector of the transistor with a constant bias and adapted to be connected to the negative voltage source, a voltage regulating diode, a resistive impedance connected to the voltage regulating diode and adapted to be connected to the negative voltage source to reverse bias the diode, and a second amplifying transistor connected to the opposite side of the voltage regulating diode and adapted to be connected to the positive voltage source, said first amplyfying transistor having a base connected between the resistive impedance and the voltage regulating diode, said second amplifying transistor having a base connected to said common emitters whereby the constant current transistor and the voltage regulating diode establishes a constant power dissipation in the transistor with a constant bias for all incoming input signals.

9. In a signal comparing circuit, a transistor with a constant bias, a transistor with a variable bias connected in parallel with the transistor with a constant bias, each of said transistors having an emitter element and a collector element and a base element, one of said elements being an input, a second of said elements being a common input-output, the third of said elements being an output, a constant current transistor connected in series circuit with the input-output elements, a load impedance connected in series with the output element of the transistor with a variable bias, voltage control means establishing a constant voltage, an amplifying transistor connected to the output element of the transistor with a constant bias and to one side of the voltage control means, and a second amplifying transistor connected to the voltage control means and to the common-connected input-output elements, said voltage control means establishing a constant voltage across the transistor with a constant bias during conduction therethrough and whereby a constant power is dissipated in the transistor with a constant bias.

10. In a signal comprising circuit, a transistor with a constant bias, a transistor with a variable bias connected in parallel with the transistor with a constant bias, each of said transistors having an emitter element and a collector element and a base element, said transistors being similarly connected to a power supply with a corresponding input element and with a common connected input-output element and with a corresponding output element, a constant current transistor connected in series circuit with the common connected input-output elements, a voltage control means establishing a constant voltage, an amplifying transistor connected in series with the output element of the transistor having a constant bias and having an input connected to one side of the voltage control means to hold the output element at the voltage of the control means, and a second amplifying transistor connected in series with the voltage control means and to the common-connected input-output elements to hold the latter at the voltage of the opposite side of the voltage control means, said voltage control means establishing a constant voltage across the transistor with a constant bias during conduction therethrough.

11. In a signal comparing circuit, a first transistor, a second transistor connected in parallel with the first transistor, each of said transistors having an emitter element and a collector element and a base element, said transistors being connected in a common emitter arrangement with the emitters being tied togther and having separate collector outputs, a constant current transistor with the output connected in series with the emitters, one of said transistors being adapted to receive a constant bias and the other to receive a variable bias, a load impedance connected in series with the output element of the transistor having the variable bias, a voltage regulating means establishing a constant voltage, an amplifying transistor having an emitter connected to the collector element of the transistor having a constant bias and having an input base connected to one side of the voltage regulating means, and a second amplifying transistor having an emitter connected to the voltage regulating means and having an input base connected to the common-connected emitters and the output of the constant current transistor, said voltage regulating means establishing a constant voltage across the transistor with a constant bias during conduction therethrough.

References Cited by the Examiner

UNITED STATES PATENTS

| | | | |
|---|---|---|---|
| 2,832,900 | 4/58 | Ford | 307—88.5 |
| 2,904,742 | 9/59 | Chase | 307—88.5 |
| 2,907,899 | 10/59 | Kabell et al. | 307—88.5 |
| 2,943,267 | 6/60 | Randise | 330—18 |
| 2,949,546 | 8/60 | McVey | 307—88.5 |
| 2,964,655 | 12/60 | Mann | 307—88.5 |

JOHN W. HUCKERT, *Primary Examiner.*

HERMAN KARL SAALBACH, *Examiner.*

UNITED STATES PATENT OFFICE

CERTIFICATE OF CORRECTION

Patent No. 3,177,372 April 6, 1965

Richard A. Greiner

It is hereby certified that error appears in the above numbered patent requiring correction and that the said Letters Patent should read as corrected below.

Column 1, line 26, for "tect" read -- detect --; line 37, for "neded" read -- needed --; column 5, line 47, for "contact" read -- constant --; column 7, line 1, for "comprising" read -- comparing --.

Signed and sealed this 24th day of August 1965.

(SEAL)
Attest:

ERNEST W. SWIDER
Attesting Officer

EDWARD J. BRENNER
Commissioner of Patents